US010563484B2

(12) United States Patent
Reyes et al.

(10) Patent No.: US 10,563,484 B2
(45) Date of Patent: Feb. 18, 2020

(54) METHODS AND SYSTEMS UTILIZING A BORON-CONTAINING CORROSION INHIBITOR FOR PROTECTION OF TITANIUM SURFACES

(71) Applicant: Halliburton Energy Services, Inc., Houston, TX (US)

(72) Inventors: Enrique Antonio Reyes, Tomball, TX (US); Aaron M. Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/818,660

(22) Filed: Aug. 5, 2015

(65) Prior Publication Data

US 2016/0265316 A1 Sep. 15, 2016

Related U.S. Application Data

(60) Provisional application No. 62/131,487, filed on Mar. 11, 2015.

(51) Int. Cl.
*E21B 41/02* (2006.01)
*C09K 8/54* (2006.01)
(Continued)

(52) U.S. Cl.
CPC ............. *E21B 41/02* (2013.01); *C09K 8/54* (2013.01); *C09K 8/74* (2013.01); *C23F 11/04* (2013.01);
(Continued)

(58) Field of Classification Search
None
See application file for complete search history.

(56) References Cited

U.S. PATENT DOCUMENTS 2,300,393 A * 11/1942 Ayers, Jr. ............ C09K 8/72
252/193
3,127,932 A * 4/1964 Schremp ............ C23F 11/187
166/310
(Continued)

FOREIGN PATENT DOCUMENTS

WO WO2016/089394 * 6/2016 ............. E21B 43/27

OTHER PUBLICATIONS

Portier, et al. "Review on chemical stimulation techniques in oil industry and applications to geothermal systems," May 2007, CREGE, Work Package 4, Participant No. 28.*
(Continued)

*Primary Examiner* — Angela M DiTrani Leff
(74) *Attorney, Agent, or Firm* — Thomas Rooney; C. Tumey Law Group PLLC (57) ABSTRACT

Some metal surfaces are often unable to be contacted effectively with fluids containing hydrofluoric acid or acidic fluoride ions due to significant corrosion issues. Metal surfaces comprising titanium or a titanium alloy represent but one example. Corrosion inhibitor compositions comprising boric acid and other boron-containing compounds may at least partially suppress corrosion of titanium and titanium alloy surfaces. Methods for suppressing corrosion may comprise: introducing a treatment fluid comprising hydrofluoric acid or a hydrofluoric acid-generating compound to a subterranean formation; forming an at least partially spent treatment fluid in the subterranean formation; adding a corrosion inhibitor composition comprising a boron-containing compound to the subterranean formation, thereby forming an inhibited, at least partially spent treatment fluid in the subterranean formation; and contacting the inhibited, at least partially spent treatment fluid with a metal surface comprising titanium or a titanium alloy.

19 Claims, 2 Drawing Sheets

(51) Int. Cl.
*C23F 11/18* (2006.01)
*C09K 8/74* (2006.01)
*C23F 11/04* (2006.01)
*C23F 11/08* (2006.01)

(52) U.S. Cl.
CPC ............ *C23F 11/08* (2013.01); *C23F 11/182* (2013.01); *C09K 2208/32* (2013.01)

(56) References Cited

U.S. PATENT DOCUMENTS

| | | | |
|---|---|---|---|
| 3,222,289 A | | 12/1965 | Clark |
| 4,330,419 A | * | 5/1982 | Hall .................. C23G 1/02 134/41 |
| 4,389,371 A | * | 6/1983 | Wilson ................ C23F 11/08 252/389.21 |
| 4,679,631 A | * | 7/1987 | Dill .................. C09K 8/528 166/307 |
| 6,001,186 A | | 12/1999 | Johnson et al. |
| 6,506,711 B1 | | 1/2003 | Shuchart et al. |
| 10,138,560 B2 | * | 11/2018 | Reyes ................ C23F 11/04 |
| 2004/0254079 A1 | | 12/2004 | Frenier et al. |
| 2005/0016731 A1 | | 1/2005 | Rae et al. |
| 2006/0131022 A1 | | 6/2006 | Rae et al. |
| 2006/0219661 A1 | | 10/2006 | Towse et al. |
| 2006/0264335 A1 | * | 11/2006 | Penna ................ C09K 8/52 507/244 |
| 2006/0281636 A1 | | 12/2006 | Smith et al. |
| 2007/0235189 A1 | | 10/2007 | Milne et al. |
| 2008/0006409 A1 | | 1/2008 | Brown et al. |
| 2008/0280046 A1 | | 11/2008 | Bryden et al. |
| 2011/0065614 A1 | * | 3/2011 | Walker ................ C09K 8/54 507/268 |
| 2011/0100630 A1 | * | 5/2011 | Evans ................ C09K 8/74 166/305.1 |
| 2011/0286802 A1 | | 11/2011 | Persson et al. |
| 2012/0238479 A1 | * | 9/2012 | Choudhary .............. C09K 8/54 507/204 |
| 2012/0325485 A1 | * | 12/2012 | Qu .................. C09K 8/528 166/312 |
| 2013/0269946 A1 | | 10/2013 | Dziekonski |
| 2013/0269947 A1 | | 10/2013 | Shilling et al. |
| 2016/0177170 A1 | * | 6/2016 | Janak ................ C09K 8/74 507/242 |

OTHER PUBLICATIONS

Lingling, et al., "Compatibility and Phase Behavior Studies Between Corrosion Inhibitor and Surfactants-Based Acids," 2012, Society of Petroleum Engineers, SPE International Symposium and Exhibition on Formation Damage Control.*

Mainier, et al., Evaluation of titanium in hydrochloric acid solutions containing corrosion inhibitors, Nov.-Dec. 2013, IOSR Journal of Mechanical and Civil Engineering, vol. 10, Issue 1, pp. 66-69 (Year: 2013).*

Kalfayan, Leonard, Ultradeep HP-HT Completions, J. Petroleum Technologies, Mar. 2007, p. 83.

Baxter et al., Experience and Guidance in the Use of Titanium Components in Steel Catenary Riser Systems, OTC 18624, 2007.

Mainier et al., Evaluation of Titanium in Hydrochloric Acid Solutions Containing Corrosion Inhibitors, IOSR Journal of Mechanical and Civil Engineering, vol. 10, Issue 1, 2013 Mechanical.

Sutter et al., The Behaviour of Titanium in Nitric-Hydrofluoric Acid Solutions, Corrosion Science, V. 30, No. 4/5, 1990 pp. 461-476.

Hua et al., Corrosion of Ti Grade 7 and Other Ti Alloys in Nuclear and Waste Repository Environments—A Review, Corrosion 2004, Paper No. 04689.

Matrix Acid Systems for Formations with High Clay Content, Discloses Use of Fluoroboric Acid and Citric Acid to Acidize, SPE 126719, 2010.

* cited by examiner

METHODS AND SYSTEMS UTILIZING A BORON-CONTAINING CORROSION INHIBITOR FOR PROTECTION OF TITANIUM SURFACES

CROSS-REFERENCE TO RELATED APPLICATIONS

The present application claims the benefit of priority under 35 U.S.C. § 119 from U.S. Provisional Patent Application 62/131,487, filed on Mar. 11, 2015.

BACKGROUND

The present disclosure generally relates to corrosion and, more specifically, to methods and systems for suppressing corrosion of titanium surfaces, particularly during subterranean treatment operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Corrosive environments comprising an acid can cause severe corrosion damage to many types of metal surfaces. As used herein, the term "corrosion" and grammatical variants thereof will refer to any reaction between a metal surface and its surrounding environment that causes a deterioration or change in the metal surface's properties or morphology. Examples of corrosion damage to a metal surface include, but are not limited to, rusting, metal dissolution or erosion, pitting, peeling, blistering, patina formation, cracking, embrittlement, and any combination thereof.

Acidic treatment fluids are frequently utilized in the course of conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. When acidizing a non-siliceous material, such as a carbonate material, mineral acids such as hydrochloric acid may often be sufficient to affect dissolution. Organic acids may be used in a similar manner to hydrochloric acid when dissolving a non-siliceous material. Siliceous materials, in contrast, are only readily dissolvable using hydrofluoric acid, optionally in combination with other acids, to provide a solubility-promoting low-pH state. Illustrative siliceous materials can include, for example, silica, silicates, aluminosilicates, and any combination thereof, optionally in further combination with a non-siliceous material, such as a carbonate material.

Corrosion of metal surfaces within a wellbore penetrating a subterranean formation, such as tubulars and tools, for example, can be highly undesirable due to the difficulty, cost, and production downtime associated with replacing or repairing such components. In many instances, elevated temperatures within subterranean formations can dramatically accelerate downhole corrosion rates. Regardless of its location, corrosion-induced damage of a metal surface can represent a significant safety and/or environmental concern due to potential well failure issues.

Metal surfaces in fluid communication with a wellbore can similarly be susceptible to corrosion and its undesirable effects. Outside the wellbore, corrosion can occur during introduction of a treatment fluid to the wellbore, during production, or any combination thereof. In subsea wellbores, for example, a subsea riser structure extending from the wellbore (e.g., via a blowout preventer) to a platform or vessel on the ocean's surface or just below the ocean's surface can be susceptible to corrosion during production of a partially spent acidic fluid from the wellbore. The risk of corrosion to various components of a subsea riser structure can be so significant that exclusion of potentially corrosive agents from the wellbore system may be warranted, possibly limiting the realm of treatment operations that are available to a well operator.

Organic corrosion inhibitors may be used to mitigate the corrosive effects of some mineral and organic acids, but not all, and numerous limitations exist. Certain metals are also more susceptible to the effects of corrosion than are others, and successful corrosion inhibitor strategies for one metal do not necessarily work for another. As used herein, the terms "inhibit," "inhibitor," "inhibition" and other grammatical forms thereof will generally refer to the lessening of the tendency of a phenomenon to occur and/or the degree to which that phenomenon occurs. The terms "suppress," "suppression" and other grammatical forms thereof may be used equivalently herein. The term "inhibit" and equivalents thereof do not imply any particular extent or amount of inhibition or suppression unless otherwise specified herein.

Hydrofluoric acid- and acidic fluoride-containing fluids can be especially corrosive toward certain types of sensitive metal surfaces, such as those containing titanium or a titanium alloy. Titanium and titanium alloys are lightweight, strong and resistant to most formation fluids and a great number of common treatment fluids, including those containing organic acids and/or mineral acids such as hydrochloric acid. However, titanium and titanium alloys are especially prone to corrosion by even modest quantities of hydrofluoric acid or fluoride ions at pH values of about 7 or less. Moreover, conventional organic corrosion inhibitors are not especially effective for titanium and titanium alloys. Without being bound by any theory or mechanism, it is believed that the extreme reactivity of titanium toward these fluids is due to removal of a passivating surface oxide by hydrofluoric acid. The extreme sensitivity of titanium and titanium alloys to hydrofluoric acid can preclude the use of hydrofluoric acid where such metals are in fluid communication with a wellbore, thereby limiting one's ability to acidize a siliceous material. For example, titanium and titanium alloys are frequently used in expansion or stress joints of subsea riser structures, which can make stimulation operations very difficult to conduct in deepwater wellbores containing a siliceous material.

Although inhibited titanium alloys (e.g., Ti Grade 29 alloy, which is inhibited by small amounts of ruthenium, or Ti Grade 7 alloy, which is inhibited by small amounts of palladium) can display a decreased propensity toward corrosion in the presence of hydrofluoric acid than do pristine titanium or uninhibited alloys (e.g., commercially pure titanium, CP-Ti), corrosion is often still an issue. Moreover, cost and sourcing of inhibited titanium alloys can be problematic, especially for large-scale operations.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

The present disclosure generally relates to corrosion and, more specifically, to methods and systems for suppressing corrosion of titanium surfaces, particularly during subterranean treatment operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

As discussed above, corrosion of metal surfaces can be detrimental for a number of reasons. It can be very difficult, in particular, to mitigate corrosion of sensitive metal surfaces, such as titanium and titanium alloy surfaces, for example, by even dilute concentrations of hydrofluoric acid or acidic fluoride ions. Short of not using hydrofluoric acid at all, there are few choices for mitigating corrosion of titanium surfaces by hydrofluoric acid or acidic fluoride ions other than by using expensive and scarce inhibited titanium alloys, and even this approach may not be sufficient to prevent excessive corrosion from occurring. If inhibited titanium alloys are not deployed during the initial stages of a treatment operation in which hydrofluoric acid might be used, there are presently few opportunities to revise the treatment protocol without leading to excessive corrosion.

The present inventors discovered that boron-containing compounds, particularly boric acid or various precursors thereof, may effectively reduce corrosion of metal surfaces comprising titanium or a titanium alloy in the presence of treatment fluids comprising hydrofluoric acid or at least partially spent variants thereof. Optionally, an organic corrosion inhibitor can also be present in combination with the boric acid to supplement further the corrosion-inhibiting effects. Further optionally, a corrosion inhibitor intensifier such as those containing antimony, bismuth, titanium, molybdenum, vanadium, or aluminum may be present.

As used herein, the term "at least partially spent treatment fluid" will refer to a treatment fluid comprising residual hydrofluoric acid and/or acidic fluoride ions that is formed upon interaction of hydrofluoric acid with a reactive material, such as a siliceous material. Initial introduction of a treatment fluid comprising hydrofluoric acid or a hydrofluoric acid-generating compound to a subterranean formation may take place through a structure that is not sensitive to hydrofluoric acid and its corrosive effects, such as a tubular or similar conduit not comprising titanium or a titanium alloy. After introducing the treatment fluid to the subterranean formation and allowing the hydrofluoric acid to at least partially react, such as during dissolution of a siliceous material, boric acid or a precursor thereof may be introduced to the at least partially spent treatment fluid, thereby forming an inhibited, at least partially spent treatment fluid. By introducing the boric acid or a precursor thereof to the treatment fluid separately, after the hydrofluoric acid has reacted in the course of performing its intended function, any potential change in the hydrofluoric acid's reactivity profile may be averted, Once the inhibited, at least partially spent treatment fluid has been formed by adding boric acid thereto, the inhibited, at least partially spent treatment fluid may be contacted effectively with a metal surface comprising titanium or a titanium alloy, such as during production. In illustrative embodiments, the titanium or titanium alloy may be present in a conduit through which the at least partially spent treatment fluid is produced, such as a subsea riser structure. Such structures may contain titanium-based stress joints, for example.

Ultimately, the methods of the present disclosure may allow hydrofluoric acid-based treatment operations to take place readily in situations where they might otherwise not be performable, such as when a metal surface comprising titanium or a titanium alloy is in fluid communication with a subterranean formation. For example, the methods of the present disclosure may allow hydrofluoric acid-based treatment operations to take place when titanium or titanium alloys are present within a subsea riser structure extending hundreds to thousands of feet below the water line.

In various embodiments, methods described herein may comprise: introducing a treatment fluid comprising hydrofluoric acid or a hydrofluoric acid to a subterranean formation; forming an at least partially spent treatment fluid in the subterranean formation; adding a corrosion inhibitor composition comprising a boron-containing compound to the at least partially spent treatment fluid in the subterranean formation, thereby forming an inhibited, at least partially spent treatment fluid in the subterranean formation; and contacting the inhibited, at least partially spent treatment fluid with a metal surface comprising titanium or a titanium alloy.

In various embodiments, the boron-containing compound may suppress corrosion of the metal surface by hydrofluoric acid. The corrosion-inhibiting effects exhibited by the boron-containing compound may include those noted above. The boron-containing compound may directly inhibit corrosion of the metal surface, or it may undergo a transformation following its introduction to the subterranean formation to form a boron-containing compound that is capable of suppressing corrosion.

In more particular embodiments, the boron-containing compound may comprise boric acid or a precursor thereof. Suitable boric acid precursors are discussed below. In some embodiments, boric acid may be added to the treatment fluid directly. In other embodiments, boric acid may be generated from a boric acid precursor that is added to the treatment fluid and undergoes subsequent conversion therein. In some embodiments, boric acid may be generated from borax and an acid such as hydrochloric acid. Other suitable boric acid precursors may include, for example, tetraborates (e.g., sodium tetraborate), tetrafluoroborates, metal borate ligand complexes (ligand=oxalic acid, citric acid, glycolic acid, lactic acid, tartaric acid, malic acid, maleic acid, succinic acid N-phosphonomethyliminodiacetic acid (PMIDA) and the like), boronic acids, boronate esters, organotrifluoroborates, boron trihalides and polymeric borates.

The chosen concentration of the boron-containing compound may represent an effective amount to counterbalance the corrosive effects of the quantity of hydrofluoric acid and/or fluoride ions that is present in the at least partially spent treatment fluid. In various embodiments, a concentration of the boron-containing compound (e.g., boric acid, any precursor thereof, or any salt thereof) in the inhibited, at least partially spent treatment fluid may range between about 0.5 wt. % and about 14 wt. %, or between about 2 wt. % and about 14 wt, %, or between about 2 wt. % and about 10 wt.

Although it may be convenient to add the corrosion inhibitor composition comprising the boron-containing compound to the at least partially spent treatment fluid in the subterranean formation, the corrosion inhibitor composition may also be introduced thereto at any location before contact with the metal surface takes place. For example, in some embodiments, the corrosion inhibitor composition may be added to the at least partially spent treatment fluid during production, provided that such addition takes place upstream of the location at which the metal surface is contacted with the treatment fluid. Addition of the corrosion inhibitor composition to the at least partially spent treatment fluid in either of the foregoing manners may be desirable when the treatment fluid can be introduced to a subterranean formation through a conduit not comprising titanium or a titanium alloy, but subsequent production needs to take place through a conduit comprising a metal surface comprising titanium or a titanium alloy, such as a subsea riser structure. In a specific example, the corrosion inhibitor composition may be added during production to the at least partially spent treatment fluid in a subsea riser structure at a location below which a titanium or titanium alloy stress joint is present. Alternately, the corrosion inhibitor composition may be added to the at least partially spent treatment fluid in a subterranean formation, and the inhibited, at least partially spent treatment fluid may safely transit the subsea riser structure during production.

In alternative embodiments, the corrosion inhibitor composition may be added to the treatment fluid prior to its introduction to the subterranean formation or during its introduction to the subterranean formation. Addition of the corrosion inhibitor composition at these locations may be feasible if the corrosion inhibitor composition does not detrimentally impact the hydrofluoric acid's reactivity toward a siliceous material in the subterranean formation and/or if a metal surface comprising titanium or a titanium alloy is encountered by the treatment fluid in transit to the subterranean formation or within a wellbore penetrating the subterranean formation, Addition of the corrosion inhibitor composition during introduction of the treatment fluid to the subterranean formation may be performed in an on-the-fly manner. Regardless of how or when the corrosion inhibitor composition is introduced, it may likewise protect a metal surface comprising titanium or a titanium alloy during production.

In still other alternative embodiments, the corrosion inhibitor composition may be introduced to the subterranean formation before the treatment fluid comprising hydrofluoric acid or a hydrofluoric acid-generating compound is introduced thereto. Handling of the corrosion inhibitor composition in this manner may likewise protect a metal surface comprising titanium or a titanium alloy in a wellbore penetrating the subterranean formation or during production.

The treatment fluids and corrosion inhibitor compositions of the present disclosure may comprise an aqueous carrier fluid or an oleaginous carrier fluid as their continuous phase. Suitable aqueous carrier fluids may include, for example, fresh water, acidified water, salt water, seawater, produced water, recycled water, brackish water, flowback water, brine (e.g., a saturated salt solution), or an aqueous salt solution (e.g., a non-saturated salt solution), Aqueous carrier fluids may be obtained from any suitable source.

In some embodiments, an aqueous carrier fluid may be chosen such that it is substantially free of alkali metal ions. Choice of an aqueous carrier fluid that is substantially free of alkali metal ions may be desirable in order to limit re-precipitation of alkali metal silicates and fluorosilicates upon dissolution of a siliceous material. For purposes of this disclosure, an aqueous carrier fluid or a treatment fluid formed therefrom will be considered to be substantially free of alkali metal ions if less than about 1 wt. % alkali metal ions are present.

In some embodiments, an organic co-solvent may be included with an aqueous carrier fluid. Suitable organic co-solvents may include, but are not limited to, glycols and alcohol solvents, for example. When present, the amount of the organic co-solvent may range between about 1% to about 50% by volume of the treatment fluid or corrosion inhibitor composition.

In other various embodiments, the carrier fluid may comprise an oleaginous carrier fluid. Suitable oleaginous carrier fluids may include, for example, an organic solvent, a hydrocarbon, oil, a refined component of oil, or any combination thereof.

In some embodiments, the hydrofluoric acid within in the treatment fluids of the present disclosure may be formed from a hydrofluoric acid-generating compound. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, titanium fluorides, boron trifluoride and various boron trifluoride complexes.

In some embodiments, an acid or an acid-generating compound may be present in combination with hydrofluoric acid or a hydrofluoric acid-generating compound. The acid or acid-generating compound and its amount may be chosen to mitigate pH changes in the treatment fluid as the hydrofluoric acid spends, for example, such as during a reaction of the hydrofluoric acid with a siliceous material in the subterranean formation.

Examples of acids suitable for use in combination with hydrofluoric acid or a hydrofluoric acid-generating compound may include, but are not limited to, hydrochloric acid, hydrobromic acid, formic acid, acetic acid, chloroacetic acid, dichloroacetic acid, trichloroacetic acid, fluoroacetic acid, difluoroacetic acid, trifluoroacetic acid, methanesulfonic acid, citric acid, maleic acid, glycolic acid, lactic acid, malic acid, oxalic acid, the like, and any combination thereof. Examples of suitable acid-generating compounds may include, but are not limited to, esters, aliphatic polyesters, orthoesters, poly(orthoesters), poly(lactides), poly (glycolides), poly(ε-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, formate esters of pentaerythritol, the like, any derivative thereof, and any combination thereof.

In various embodiments, a concentration of hydrofluoric acid or generatable hydrofluoric acid in the treatment fluid may range between about 0.5 wt, % and about 5 wt. %. These values may represent the ultimate hydrofluoric acid concentration attainable in the treatment fluid introduced to the subterranean formation and/or the combined concentration of hydrofluoric acid and fluoride ions in the at least partially spent treatment fluid. Hydrofluoric acid concentrations in this range may be particularly effective for performing various subterranean treatment operations, such as descaling and dissolution of siliceous materials, for example.

In some embodiments, a chelating agent may also be present in the treatment fluid in combination with the hydrofluoric acid. The optional chelating agent may increase the amount of metal ions that are complexed within the subterranean formation. For example, metal ions liberated upon dissolution of a siliceous material or a carbonate material within the subterranean formation may be complexed by the chelating agent in order to suppress their subsequent reprecipitation. When present, the chelating agent may be initially present in the treatment fluid with the hydrofluoric acid or hydrofluoric acid-generating compound, or the chelating agent may be added on-the-fly as the treatment fluid is being introduced to the subterranean formation.

Suitable chelating agents are not believed to be particularly limited. In illustrative embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediamindi(o-hydroxyphenylacetic) acid (EDDHA), glucoheptonic acid, gluconic acid, citric acid, any salt thereof, any derivative thereof, or the like may be present as the optional chelating agent.

In other various embodiments, an aminopolycarboxylic acid may be present as the optional chelating agent. A number of aminopolycarboxylic acids have the additional advantage of being biodegradable, which may be advantageous for their use in various subterranean treatment operations. Illustrative aminopolycarboxylic acid chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy) ethyl]glycine (BCA6), N-bis[2-(1,2-dicarboxyethoxy)ethyl] aspartic acid (BCA5), N-bis[2-(1,2-dicarboxyethoxy)ethyl] methylglycine (MCBA5), N-tris[(1,2-dicarboxyethoxy) ethyl]amine (TCA6), N-bis[2-(carboxymethoxy)ethyl] glycine (BCA3), N-bis[2-(methylcarboxymethoxy)ethyl] glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N"-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N, N'-disuccinic acid, 1,3-propylenediamine-N,N'-disuccinic acid, ds-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, any salt thereof, any derivative thereof, or any combination thereof.

In still other various embodiments, an N-(phosphonoalkyl)iminodiacetic acid or any salt thereof may be present as the optional chelating agent, Not only may such substances complex metal ions, but they may also help suppress corrosion as well, including hydrofluoric acid-induced corrosion. In illustrative embodiments, a suitable N-(phosphonoalkyl)iminodiacetic acid that may be used in the embodiments of the present disclosure is N-(phosphonomethyl) iminodiacetic acid (PMIDA).

In some embodiments, the corrosion inhibitor composition may further comprise an organic corrosion inhibitor. The identity and amount of the organic corrosion inhibitor may vary in view of the amounts of hydrofluoric acid, the boron-containing compound and/or any salt thereof that are present, for example. The type of titanium surface may also dictate, at least in part, the identity and amount of an organic corrosion inhibitor needed to provide effective corrosion suppression. In illustrative embodiments, a concentration of the organic corrosion inhibitor in the inhibited, at least partially spent treatment fluid may range between about 0.1 wt. % to about 5 wt. %. In more specific embodiments, a concentration of the organic corrosion inhibitor may range between about 0.5 wt. % to about 5 wt. %, or between about 1 wt. % to about 3 wt. %, or between about 2 wt. % to about 4 wt. %. The organic corrosion inhibitor may be added concurrently with the boron-containing compound or separately. When added concurrently, the boron-containing compound and the organic corrosion inhibitor may be present in the same fluid stream or in different fluid streams.

Illustrative organic corrosion inhibitors may include compounds such as, for example, an acetylenic alcohol, a Mannich condensation product, an unsaturated carbonyl compound, an unsaturated ether, formamide or a reaction product thereof, a formate, an iodide, a terpene, an aromatic hydrocarbon, cinnamaldehyde or a derivative thereof, a fluorinated surfactant, a quaternary derivative of a heterocyclic nitrogen base, a quaternary derivative of a halomethylated aromatic compound, or any combination thereof. Other illustrative corrosion inhibitors may include, for example, a reaction product of an α,β-unsaturated aldehyde or ketone with a primary or secondary amine, and a reaction product of an aldehyde with a thiol and/or an amide. The reaction product may be pre-formed before placing it in the treatment fluid, or it may be formed in situ from the individual components within a corrosive environment. In illustrative embodiments, suitable organic corrosion inhibitors may comprise MSA-III (a sulfur-containing organic acid corrosion inhibitor), HAI-404M (a quaternary ammonium corrosion inhibitor), or HAI-OS (an acetylenic alcohol corrosion inhibitor), each of which is available from Halliburton Energy Services.

Further optionally, a corrosion inhibitor intensifier may be present in the corrosion inhibitor composition. Corrosion inhibitor intensifiers, sometimes referred to as activators, can function to activate another corrosion inhibitor. Corrosion inhibitor intensifiers that can be used in the embodiments of the present disclosure include, for example, quaternary ammonium compounds, molybdate salts (including heteropolymolybdates), copper compounds (e.g., cuprous iodide, and cuprous chloride), antimony compounds (e.g., antimony oxides, antimony halides, antimony tartrate, antimony citrate, antimony tartrate, antimony citrate, pyroantimonate salts, and antimony adducts of ethylene glycol), bismuth compounds (e.g., bismuth oxides, bismuth halides, bismuth tartrate, and bismuth citrate), iodine, iodide compounds (e.g., potassium iodide and sodium iodide), formic acid, and any combination thereof. When present, a concentration of the corrosion inhibitor intensifier in a treatment fluid may range from about 0.1 wt. % to about 5.0 wt. % or from about 0.1 wt. % to about 8 wt. %.

In additional embodiments, the treatment fluids described herein may further comprise any number of additives that are commonly used in downhole operations including, for example, silica scale control additives, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Any combination of these additives may be used as well. One of ordinary skill in the art will be able to formulate a treatment fluid having properties suitable for a given application.

Once within a subterranean formation, the treatment fluid comprising the hydrofluoric acid or hydrofluoric acid-generating compound may perform various functions, such as the treatment operations described above. In more particular embodiments, the treatment operation may comprise contacting a siliceous material in the subterranean formation with the treatment fluid, and reacting the siliceous material with the hydrofluoric acid to form the at least partially spent treatment fluid in the subterranean formation. Reacting the siliceous material with the hydrofluoric acid may comprise at least partially dissolving the siliceous material with the treatment fluid, such that at least a portion of the hydrofluoric acid spends to produce fluoride ions. Illustrative siliceous materials that may be contacted and dissolved with the hydrofluoric acid include, for example, silica, silicates, aluminosilicates, geothermal scale, the like, and any combination thereof.

In further embodiments, the methods of the present disclosure may comprise producing the inhibited, at least partially spent treatment fluid from the subterranean formation. In more particular embodiments, production of the inhibited, at least partially spent treatment fluid may take place through a conduit containing the metal surface. In more specific embodiments, the conduit may comprise at least a portion of a subsea riser structure, through which the inhibited, at least partially spent treatment fluid is produced. In still more specific embodiments, the metal surface may comprise a titanium-containing stress joint, such as those found in subsea riser structures.

Accordingly, in more specific embodiments, methods of the present disclosure may comprise: introducing a treatment fluid comprising hydrofluoric acid or a hydrofluoric acid-generating compound to a subterranean formation comprising a siliceous material; reacting the siliceous material with the hydrofluoric acid to form an at least partially spent treatment fluid in the subterranean formation; adding a corrosion inhibitor composition comprising a boron-containing compound to the at least partially spent treatment fluid, thereby forming an inhibited, at least partially spent treatment fluid; and producing the inhibited, at least partially spent treatment fluid from the subterranean formation through a conduit containing a metal surface comprising titanium or a titanium alloy. In some embodiments, the inhibited, at least partially spent treatment fluid may be formed in and produced from the subterranean formation. In other embodiments, the inhibited, at least partially spent treatment fluid may be formed external to the subterranean formation, before being produced and contacting a metal surface comprising titanium or a titanium alloy.

Although the features of the present disclosure may be particularly advantageous when used in conjunction with subterranean treatment operations, a corrosion inhibitor composition comprising a boron-containing compound may be used similarly to suppress corrosion of titanium surfaces in any type of in-process setting. For example, boric acid or a precursor thereof may be used for suppressing corrosion of a metal surface comprising titanium or a titanium alloy in a plant or process setting in which hydrofluoric acid is used. Illustrative plant or process settings in which boric acid or a precursor thereof may be used to inhibit corrosion include, for example, manufacturing processes using dilute hydrofluoric acid solutions, storage and transport structures for dilute hydrofluoric acid solutions, and the like.

In other various embodiments, systems configured for delivering a corrosion inhibitor composition of the present disclosure to a downhole location are described herein. In various embodiments, the systems can comprise a pump fluidly coupled to a tubular, the tubular containing a corrosion inhibitor composition comprising a boron-containing compound and being configured to add the corrosion inhibitor composition to a treatment fluid in a subterranean formation. The treatment fluid may comprise hydrofluoric acid or a hydrofluoric acid-generating compound, or an at least partially spent variant thereof. A metal surface comprising titanium or a titanium alloy may be in fluid communication with the subterranean formation. The system may be further configured to produce an inhibited, at least partially spent treatment fluid from the subterranean formation, once the corrosion inhibitor composition has been combined with the treatment fluid.

In more specific embodiments, the tubular may be in fluid communication with a metal surface comprising titanium or a titanium alloy. In still more specific embodiments, the metal surface comprising titanium or a titanium alloy may comprise at least a portion of a subsea riser structure, such as the illustrative subsea riser structure shown in FIG. 2.

The pump may be a high pressure pump in some embodiments. As used herein, the term "high pressure pump" will refer to a pump that is capable of delivering a fluid downhole at a pressure of about 1000 psi or greater. A high pressure pump may be used when it is desired to introduce a corrosion inhibitor composition of the present disclosure to a subterranean formation at or above a fracture gradient of the subterranean formation, but it may also be used in cases where fracturing is not desired. The corrosion inhibitor compositions described herein may be introduced with a high pressure pump, or they may be introduced following a treatment fluid that was introduced with a high pressure pump. In some embodiments, the high pressure pump may be capable of fluidly conveying particulate matter into the subterranean formation. Suitable high pressure pumps will be known to one having ordinary skill in the art and may include, but are not limited to, floating piston pumps and positive displacement pumps.

In other embodiments, the pump may be a low pressure pump. As used herein, the term "low pressure pump" will refer to a pump that operates at a pressure of about 1000 psi or less. In some embodiments, a low pressure pump may be fluidly coupled to a high pressure pump that is fluidly coupled to the tubular. That is, in such embodiments, the low pressure pump may be configured to convey the corrosion inhibitor composition to the high pressure pump. In such embodiments, the low pressure pump may "step up" the pressure of the corrosion inhibitor composition before it reaches the high pressure pump. Alternately, the low pressure pump may be used to directly introduce the corrosion inhibitor composition to the subterranean formation.

In some embodiments, the systems described herein can further comprise a mixing tank that is upstream of the pump and in the corrosion inhibitor composition is formulated with a carrier fluid. In various embodiments, the pump (e.g., a low pressure pump, a high pressure pump, or a combination thereof) may convey the corrosion inhibitor composition from the mixing tank or other source to the tubular. In other embodiments, however, the corrosion inhibitor composition can be formulated offsite and transported to a worksite, in which case the corrosion inhibitor composition may be introduced to the tubular via the pump directly from its shipping container (e.g., a truck, a railcar, a barge, or the like) or from a transport pipeline. In either case, the corrosion inhibitor composition may be drawn into the pump, elevated to an appropriate pressure, and then introduced into the tubular for delivery downhole.

Figure 1:
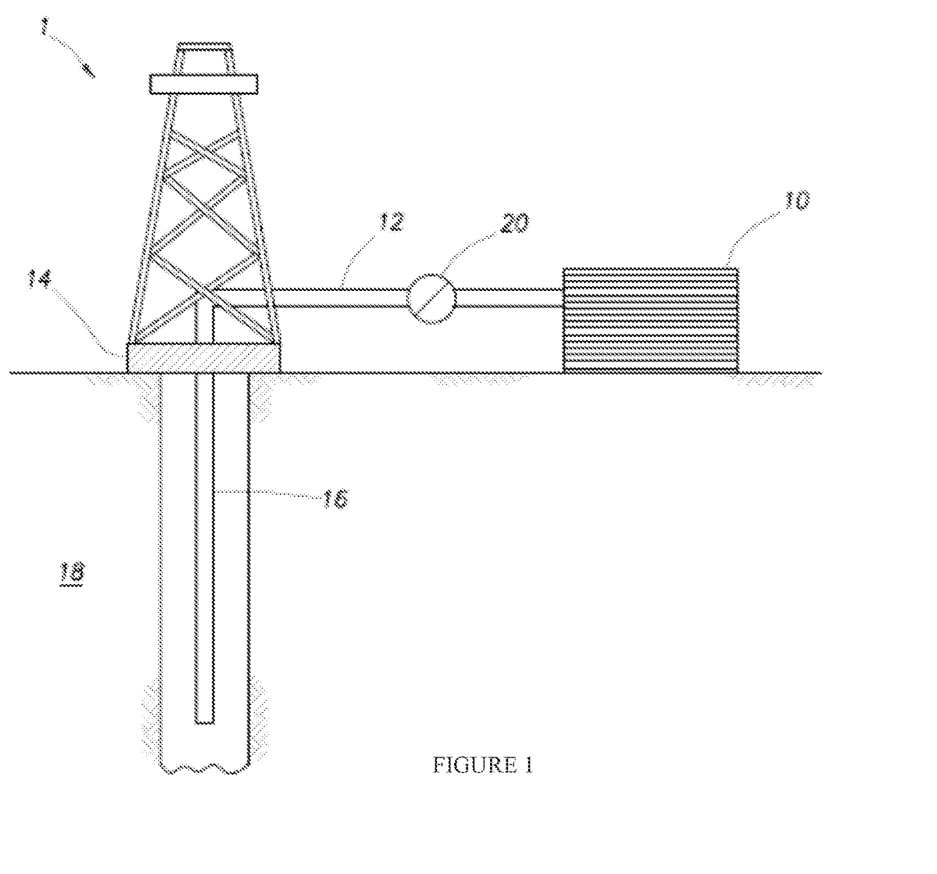
FIG. 1 shows an illustrative schematic of a system that can deliver corrosion inhibitor compositions of the present disclosure to a downhole location, according to one or more embodiments.

FIG. 1 shows an illustrative schematic of a system that can deliver corrosion inhibitor compositions of the present disclosure to a downhole location, according to one or more embodiments. It should be noted that while FIG. 1 generally depicts a land-based system, it is to be recognized that like systems may be operated in subsea locations as well. For example, the corrosion inhibitor composition may be delivered to the downhole location of a subsea wellbore using the tubular and then undergo production through a subsea riser structure, such as a subsea riser containing titanium or a titanium alloy (see FIG. 2). As depicted in FIG. 1, system 1 may include mixing tank 10, in which a corrosion inhibitor composition of the present disclosure may be formulated. The corrosion inhibitor composition may be conveyed via line 12 to wellhead 14, where the corrosion inhibitor composition enters tubular 16, tubular 16 extending from wellhead 14 into subterranean formation 18. Tubular 16 may include orifices that allow the corrosion inhibitor composition to enter into the wellbore. Pump 20 may be configured to raise the pressure of the corrosion inhibitor composition to a desired degree before its introduction into tubular 16. It is to be recognized that system 1 is merely exemplary in nature and various additional components may be present that have not necessarily been depicted in FIG. 1 in the interest of clarity. Non-limiting additional components that may be present include, but are not limited to, supply hoppers, valves, condensers, adapters, joints, gauges, sensors, compressors, pressure controllers, pressure sensors, flow rate controllers, flow rate sensors, temperature sensors, and the like.

It is also to be recognized that the disclosed corrosion inhibitor compositions and treatment fluids may also directly or indirectly affect the various downhole equipment and tools that may come into contact with these materials during operation, Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Figure 2:
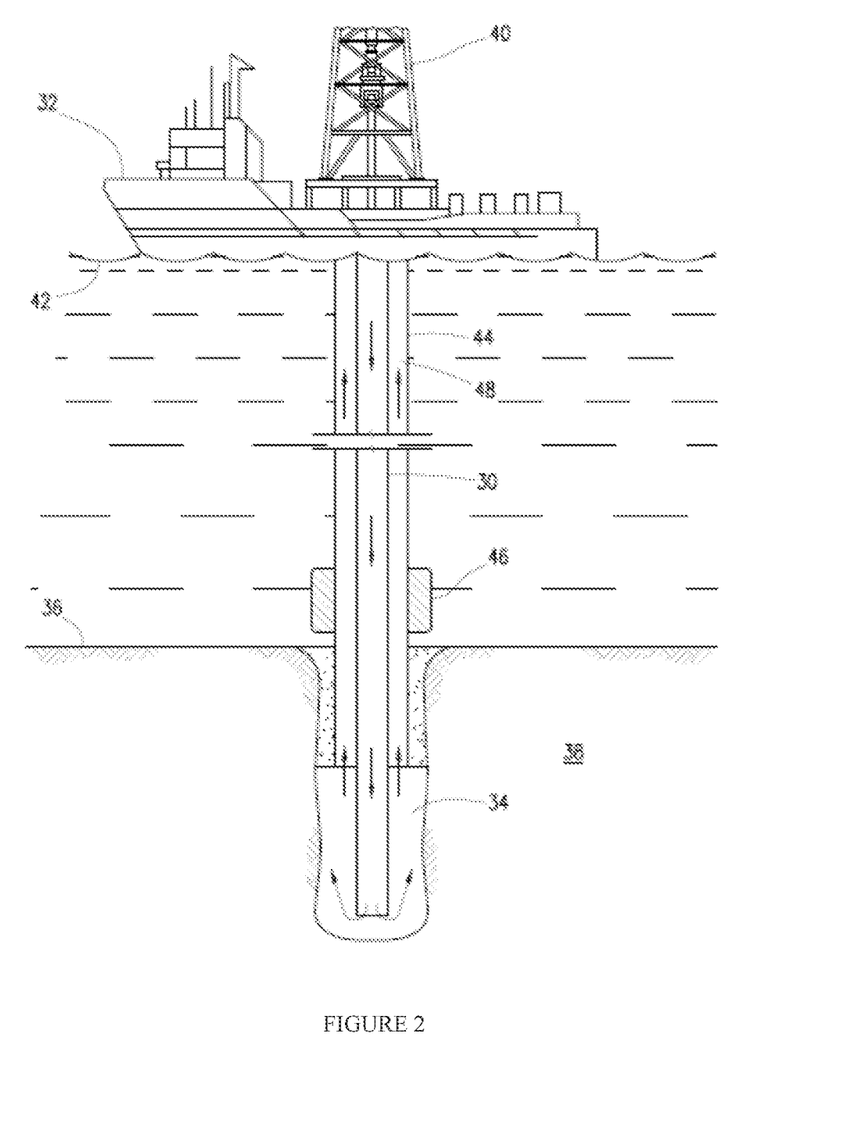
FIG. 2 shows an illustrative schematic of a subsea riser structure in fluid communication with a subterranean formation.

FIG. 2 shows an illustrative schematic of a subsea riser structure in fluid communication with a subterranean formation. As shown in FIG. 2, tubular 30 extends from platform or ship 32 into wellbore 34, which extends below seabed 36 and penetrates subterranean formation 38. Tubular 30 may be similar to that shown in system 1 of FIG. 1 and may be better understood by reference thereto. Rig 40 resides upon platform or ship 32 above waterline 42. Subsea riser extends between platform or ship 32 and wellbore 34, spanning at least the distance between waterline 42 and seabed 36 and also passing through blowout preventer 46. Tubular 30 resides within subsea riser structure 44, and annular space 48 is defined therebetween.

A treatment fluid comprising hydrofluoric acid or a hydrofluoric acid-generating compound may be introduced to wellbore 34 through tubular 30 or a secondary conduit (not depicted). Upon interacting the hydrofluoric acid with a siliceous material, the treatment fluid becomes at least partially spent. Before producing the at least partially spent treatment fluid from wellbore 34 through annulus 48 of subsea riser structure 44, a corrosion inhibitor composition is also added via tubular 30 or a secondary conduit, thus inhibiting the at least partially spent treatment fluid as described above. The corrosion inhibitor composition may be added into wellbore 34 or within subsea riser structure 44 at a location upstream of a titanium or titanium alloy surface. Accordingly, the corrosion inhibitor composition may suppress corrosion of a titanium or titanium alloy surface within subsea riser structure 44 upon production.

Embodiments disclosed herein include:

A. Methods for suppressing corrosion. The methods comprise: introducing a treatment fluid comprising hydrofluoric acid or a hydrofluoric acid-generating compound to a subterranean formation; forming an at least partially spent treatment fluid in the subterranean formation; adding a corrosion inhibitor composition comprising a boron-containing compound to the subterranean formation, thereby forming an inhibited, at least partially spent treatment fluid in the subterranean formation; and contacting the inhibited, at least partially spent treatment fluid with a metal surface comprising titanium or a titanium alloy.

B. Methods for suppressing corrosion. The methods comprise: introducing a treatment fluid comprising hydrofluoric acid or a hydrofluoric acid-generating compound to a subterranean formation comprising a siliceous material; reacting the siliceous material with the hydrofluoric acid to form an at least partially spent treatment fluid in the subterranean formation; adding a corrosion inhibitor composition comprising a boron-containing compound to the at least partially spent treatment fluid, thereby forming an inhibited, at least partially spent treatment fluid; and producing the inhibited, at least partially spent treatment fluid through a conduit containing a metal surface comprising titanium or a titanium alloy.

C. Systems for introducing a corrosion inhibitor composition into a wellbore. The systems comprise: a pump fluidly coupled to a tubular, the tubular containing a corrosion inhibitor composition comprising a boron-containing compound and being configured to add the corrosion inhibitor composition to a treatment fluid in a subterranean formation, the treatment fluid comprising hydrofluoric acid or a hydrofluoric acid-generating compound, or an at least partially spent variant thereof; wherein a metal surface comprising titanium or a titanium alloy is in fluid communication with the subterranean formation.

Each of embodiments A-C may have one or more of the following additional elements in any combination:

Element 1: wherein the boron-containing compound suppresses corrosion of the metal surface by hydrofluoric acid.

Element 2: wherein the method further comprises producing the inhibited, at least partially spent treatment fluid from the subterranean formation.

Element 3: wherein the inhibited, at least partially spent treatment fluid is produced through a conduit containing the metal surface.

Element 4: wherein the metal surface comprises a titanium-containing stress joint.

Element 5: wherein the treatment fluid is introduced to the subterranean formation through a conduit not comprising titanium or a titanium alloy.

Element 6: wherein the conduit comprises at least a portion of a subsea riser structure, through which the inhibited, at least partially spent treatment fluid is produced.

Element 7: wherein the boron-containing compound comprises boric acid or a precursor thereof.

Element 8: wherein a concentration of hydrofluoric acid or generatable hydrofluoric acid in the treatment fluid ranges between about 0.5 wt. % and about 5 wt. %.

Element 9: wherein a concentration of the boron-containing compound in the inhibited, at least partially spent treatment fluid ranges between about 2 wt. % and about 10 wt. %.

Element 10: wherein the corrosion inhibitor composition further comprises an organic corrosion inhibitor.

Element 11: wherein the method further comprises contacting a siliceous material in the subterranean formation with the treatment fluid; and reacting the siliceous material with the hydrofluoric acid to form the at least partially spent treatment fluid in the subterranean formation.

Element 12: wherein the inhibited, at least partially spent treatment fluid is formed in and produced from the subterranean formation.

By way of non-limiting example, exemplary combinations applicable to A and B include:

The method of A in combination with elements 1 and 3.
The method of A in combination with elements 2 and 5.
The method of A in combination with elements 2 and 3.
The method of A in combination with elements 4 and 6.
The method of A in combination with elements 3 and 6.
The method of A in combination with elements 3 and 7.
The method of A in combination with elements 3, 6 and 7.
The method of A in combination with elements 7 and 9.
The method of A in combination with elements 7 and 10.
The method of A in combination with elements 1 and 11.
The method of A in combination with elements 7 and 11.
The method of A in combination with elements 7, 9 and 11.
The method of A in combination with elements 7 and 12.
The method of A in combination with elements 9 and 10.
The method of B in combination with elements 3 and 4.
The method of B in combination with elements 5 and 8.
The method of B in combination with elements 7 and 9.
The method of B in combination with elements 7 and 10.
The method of B in combination with elements 3 and 5.
The method of B in combination with elements 6 and 7.
The method of B in combination with elements 9 and 10.
The system of C in combination with elements 4 and 7.
The system of C in combination with elements 7 and 9.

To facilitate a better understanding of the embodiments of the present disclosure, the following examples of preferred or representative embodiments are given. In no way should the following examples be read to limit, or to define, the scope of the disclosure.

EXAMPLES

Example 1

Treatment fluids comprising 1% hydrofluoric acid, 5 wt. % CLA-WEB stabilizing additive (Halliburton Energy Services), MGA, and various quantities of boric acid were exposed to a titanium alloy over a period of time in the presence of an additional corrosion inhibitor. Testing conditions and results are further summarized in Table 1.

TABLE 1

| Ti Alloy | Temperature (° F.) | Time (hr) | Additional Corrosion Inhibitor | Boric Acid (%) | Corrosion Loss (lb/ft$^2$) | Additives |
| --- | --- | --- | --- | --- | --- | --- |
| Ti-29 | 140 | 6 | 2.5% MSA-III | 4 | 0.013 | none |
| Ti-29 | 140 | 6 | 2.5% HAI-OS | 4 | 0.0057 | none |
| Ti-1 | 250 | 3 | 1% HAI-OS | 4 | 0.073 | none |
| Ti-1 | 250 | 3 | 1% MSA-III | 4 | 0.079 | none |
| Ti-1 | 200 | 3 | 1% MSA-III | 4 | 0.042 | none |
| Ti-1 | 250 | 3 | 1% MSA-III | 0 | 0.128 | 2% ZrOCl$_2$ |
| Ti-1 | 250 | 3 | 1% MSA-III | 0 | 0.072 | 4% ZrOCl$_2$ |
| Ti-1 | 250 | 3 | 1% MSA-III | 3 | 0.061 | 4% ZrOCl$_2$ |

As shown in Table 1, significantly less corrosion loss usually occurred when boric acid was present compared to when it was not. Effective corrosion suppression for even uninhibited Ti-1 alloy was realized in the presence of boric acid. The impact of ZrOCl$_2$ was negligible under the test conditions.

Example 2

A Ti Grade 29 substrate was exposed for 6 hours at constant temperature to various treatment fluids comprising 1% hydrofluoric acid generated from ammonium bifluoride in water and having a pH of 2.8. In addition, the treatment fluids comprised 4 wt. % boric acid, 5 wt. % CLA-WEB stabilizing additive, 0.5 wt. % surfactant, and MGDA. Testing conditions and results are summarized in Table 2. N-(phosphonomethyl)iminodiacetic acid (PMIDA) was present in certain fluids (see Table 2).

TABLE 2

| Ti Alloy | Temperature (° F.) | [HF] (wt. %) | [PMIDA] (wt. %) | Additional Corrosion Inhibitor | Corrosion Loss (lb/ft$^2$) |
| --- | --- | --- | --- | --- | --- |
| Ti-29 | 140 | 1 | none | MSA-III (2.5 wt. %) | 0.013 |
| Ti-29 | 140 | 1 | 2.5 | none | 0.000 |
| Ti-29 | 140 | 1 | none | HAI-OS (2.5 wt. %) | 0.005 |

As shown in Table 2, low corrosion loss rates were observed in the presence of boric acid. When PMIDA was present, an even lower corrosion loss rate was realized. No obvious pitting of the substrate was evident, particularly in the presence of PMIDA.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    introducing a treatment fluid comprising hydrofluoric acid or a hydrofluoric acid-generating compound to a subterranean formation;
    forming an at least partially spent treatment fluid in the subterranean formation;
    introducing a corrosion inhibitor composition comprising boric acid to the subterranean formation separately, after the treatment fluid has reacted, thereby forming an inhibited, at least partially spent treatment fluid in the subterranean formation, the inhibited, at least partially spent treatment fluid comprising the at least partially spent treatment fluid and the corrosion inhibitor composition;
    contacting the inhibited, at least partially spent treatment fluid with a metal surface comprising titanium or a titanium alloy; and
    suppressing corrosion of the metal surface comprising titanium or a titanium alloy by interacting the boric acid with the hydrofluoric acid or fluoride ions present in the at least partially spent treatment fluid.

2. The method of claim 1, further comprising:
    producing the inhibited, at least partially spent treatment fluid from the subterranean formation.

3. The method of claim 2, wherein the inhibited, at least partially spent treatment fluid is produced through a conduit containing the metal surface.

4. The method of claim 3, wherein the metal surface comprises a titanium-containing stress joint.

5. The method of claim 3, wherein the treatment fluid is introduced to the subterranean formation through a conduit not comprising titanium or a titanium alloy.

6. The method of claim 3, wherein the conduit comprises at least a portion of a subsea riser structure, through which the inhibited, at least partially spent treatment fluid is produced.

7. The method of claim 1, wherein a concentration of hydrofluoric acid or generatable hydrofluoric acid in the treatment fluid ranges between about 0.5 wt. % and about 5 wt. %.

8. The method of claim 1, wherein a concentration of the boric acid in the inhibited, at least partially spent treatment fluid ranges between about 2 wt. % and about 10 wt. %.

9. The method of claim 1, wherein the corrosion inhibitor composition further comprises an organic corrosion inhibitor.

10. The method of claim 1, further comprising:
    contacting a siliceous material in the subterranean formation with the treatment fluid; and
    reacting the siliceous material with the hydrofluoric acid to form the at least partially spent treatment fluid in the subterranean formation.

11. The method of claim 1, wherein the corrosion inhibitor composition further comprises at least one of antimony, bismuth, titanium, molybdenum, vanadium or aluminum.

12. A method comprising:
    introducing a treatment fluid comprising hydrofluoric acid or a hydrofluoric acid-generating compound to a subterranean formation comprising a siliceous material;

reacting the siliceous material with the hydrofluoric acid to form an at least partially spent treatment fluid in the subterranean formation;

introducing a corrosion inhibitor composition comprising boric acid to the at least partially spent treatment fluid separately, after the treatment fluid has reacted, thereby forming an inhibited, at least partially spent treatment fluid, the inhibited, at least partially spent treatment fluid comprising the at least partially spent treatment fluid and the corrosion inhibitor composition;

producing the inhibited, at least partially spent treatment fluid through a conduit containing a metal surface comprising titanium or a titanium alloy; and suppressing corrosion of the conduit containing the metal surface comprising titanium or a titanium alloy by interacting the boric acid with hydrofluoric acid or fluoride ions present in the at least partially spent treatment fluid, wherein the inhibited, at least partially spent treatment fluid is formed external to the subterranean formation, but before being produced through the conduit containing the metal surface consisting of titanium or a titanium alloy.

13. The method of claim 12, wherein the conduit comprises at least a portion of a subsea riser structure, through which the inhibited, at least partially spent treatment fluid is produced.

14. The method of claim 12, wherein the treatment fluid is introduced to the subterranean formation through a conduit not comprising titanium or a titanium alloy.

15. The method of claim 12, wherein a concentration of hydrofluoric acid or generatable hydrofluoric acid in the treatment fluid ranges between about 0.5 wt. % and about 5 wt. %.

16. The method of claim 12, wherein a concentration of the boron-containing compound in the inhibited, at least partially spent treatment fluid ranges between about 2 wt. % and about 10 wt. %.

17. The method of claim 12, wherein the corrosion inhibitor composition further comprises an organic corrosion inhibitor.

18. The method of claim 12, wherein the metal surface comprises a titanium-containing stress joint.

19. The method of claim 12, wherein the corrosion inhibitor composition further comprises at least one of antimony, bismuth, titanium, molybdenum, vanadium or aluminum.

* * * * *